United States Patent
Lee

(10) Patent No.: US 10,754,768 B2
(45) Date of Patent: Aug. 25, 2020

(54) MEMORY SYSTEM USING DESCRIPTOR LOOKUP TABLES TO ACCESS SETTING INFORMATION FOR A NON-VOLATILE MEMORY, AND AN OPERATING METHOD THEREOF

(71) Applicant: SK hynix Inc., Gyeonggi-do (KR)

(72) Inventor: Joo Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 32 days.

(21) Appl. No.: 16/145,433

(22) Filed: Sep. 28, 2018

(65) Prior Publication Data

US 2019/0278704 A1  Sep. 12, 2019

(30) Foreign Application Priority Data

Mar. 7, 2018  (KR) ........................ 10-2018-0026876

(51) Int. Cl.
*G06F 12/00* (2006.01)
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0688* (2013.01); *G06F 3/0616* (2013.01); *G06F 3/0679* (2013.01); *G06F 2212/7201* (2013.01); *G06F 2212/7207* (2013.01)

(58) Field of Classification Search
CPC .... G06F 12/0246; G06F 3/064; G06F 3/0688; G06F 2212/7201; G06F 2212/7207; G06F 3/0616; G06F 3/0679
USPC ....................................................... 711/103
See application file for complete search history.

(56) References Cited

U.S. PATENT DOCUMENTS

2015/0355965 A1* 12/2015 Peddle ................... G06F 13/28
714/773

FOREIGN PATENT DOCUMENTS

KR          101301840          8/2013

\* cited by examiner

*Primary Examiner* — Mardochee Chery
(74) *Attorney, Agent, or Firm* — IP & T Group LLP

(57) ABSTRACT

A memory system includes a nonvolatile memory device; In an embodiment, a memory system comprising: a nonvolatile memory device; a working memory configured to store a first layer and a second layer as firmwares, each of which drives the nonvolatile memory device; a control component configured to control the nonvolatile memory device based on the firmwares; a buffer memory configured to store a first table which is managed by the first layer and a second table which is managed by the second layer; and a memory controller configured to store a descriptor for setting information of the nonvolatile memory device, and interface with the nonvolatile memory device based on control of the control component, wherein the second layer stores position information of the descriptor in the second table, and wherein the first layer accesses the memory controller by referring to the second table.

18 Claims, 10 Drawing Sheets

FIG.4

Second look-up table (LUT2)

| Descriptor (DSC) | Descriptor address (ADD_DSC) | Information (INF) |
|---|---|---|
| DSC0 | ADD_DSC0 | Die information (INF_DIE) |
| DSC1 | ADD_DSC1 | Block information (INF_BLK) |
| DSC2 | ADD_DSC2 | Page information (INF_PG) |
| ⋮ | ⋮ | |
| DSCk | ADD_DSCk | |

MEMORY SYSTEM USING DESCRIPTOR LOOKUP TABLES TO ACCESS SETTING INFORMATION FOR A NON-VOLATILE MEMORY, AND AN OPERATING METHOD THEREOF

CROSS-REFERENCES TO RELATED APPLICATION

The present application claims priority under 35 U.S.C. § 119(a) to Korean application number 10-2018-0026876, filed on Mar. 7, 2018, in the Korean Intellectual Property Office, which is incorporated herein by reference in its entirety.

BACKGROUND

1. Technical Field

Various embodiments of the present invention generally relate to a memory system and an electronic apparatus. Particularly, the embodiments relate to a memory system and an electronic apparatus which include a nonvolatile memory device.

2. Related Art

A memory system may be configured to store the data provided from an external device, in response to a write request from the external device. Also, the memory system may be configured to provide stored data to the external device, in response to a read request from the external device. The external device as a device capable of processing data may include a computer, a digital camera or a mobile phone. The memory system may operate by being built in the external device, or may operate by being manufactured in a separable form and being coupled to the external device.

Since there is no mechanical driving part, a memory system using a memory device provides advantages such as excellent stability and durability, high information access speed, and low power consumption. Memory systems having such advantages include a universal serial bus (USB) memory device, memory cards having various interfaces, a universal flash storage (UFS) device, and a solid state drive (SSD).

SUMMARY

Various embodiments are directed to a memory system and an electronic apparatus which solve a problem that independency between layers constructing firmwares is not maintained.

In an embodiment, a memory system comprising: a nonvolatile memory device; a working memory configured to store a first layer and a second layer as firmwares, each of which drives the nonvolatile memory device; a control component configured to control the nonvolatile memory device based on the firmwares; a buffer memory configured to store a first table which is managed by the first layer and a second table which is managed by the second layer; and a memory controller configured to store a descriptor for setting information of the nonvolatile memory device, and interface with the nonvolatile memory device based on control of the control component, wherein the second layer stores position information of the descriptor in the second table, and wherein the first layer accesses the memory controller by referring to the second table.

In an embodiment, A method for operating a memory system, comprising: generating, by a controller, a descriptor for setting information of a nonvolatile memory device; storing position information of the descriptor in a table which is managed by a second layer; obtaining the position information by accessing the table based on a first layer; obtaining the setting information by accessing the descriptor based on the position information; and generating a command to access the nonvolatile memory device, by referring to the setting information.

In an embodiment, firmwares, each of which drives a system; and a non-transitory machine-readable storage medium for storing instructions to be executed by the controller that instruct the controller to perform processes comprising: generating a descriptor for setting information of the non-transitory machine-readable storage medium; storing position information of the descriptor in a table managed by the second layer; obtaining the position information by accessing the table based on the first layer; obtaining the setting information by accessing the descriptor based on the position information; and generating a command to access the non-transitory machine-readable storage medium by referring to the setting information.

In an embodiment, A memory controller for controlling a nonvolatile memory device comprising: a flash translation layer and a flash interface layer as firmwares for driving the nonvolatile memory device; a buffer memory including a first table for storing information managed by the flash translation layer and a second table for storing information managed by the second layer; a memory controller configured to store a descriptor for setting information of the nonvolatile memory device, and interface with the nonvolatile memory device; and a control component configured to control the nonvolatile memory device based on the firmwares through the memory controller, wherein the control component controls that the flash interface layer stores position information of the descriptor in the second table, and the flash translation layer accesses the nonvolatile memory device through the memory controller based on the position information of the descriptor In the memory system according to the embodiment, by securing independency between a plurality of layers constructing firmwares, it is possible to efficiently control a nonvolatile memory device.

BRIEF DESCRIPTION OF THE DRAWINGS

FIG. 4 is a diagram illustrating a second look-up table in accordance with the embodiment.

DETAILED DESCRIPTION

Figure 1:
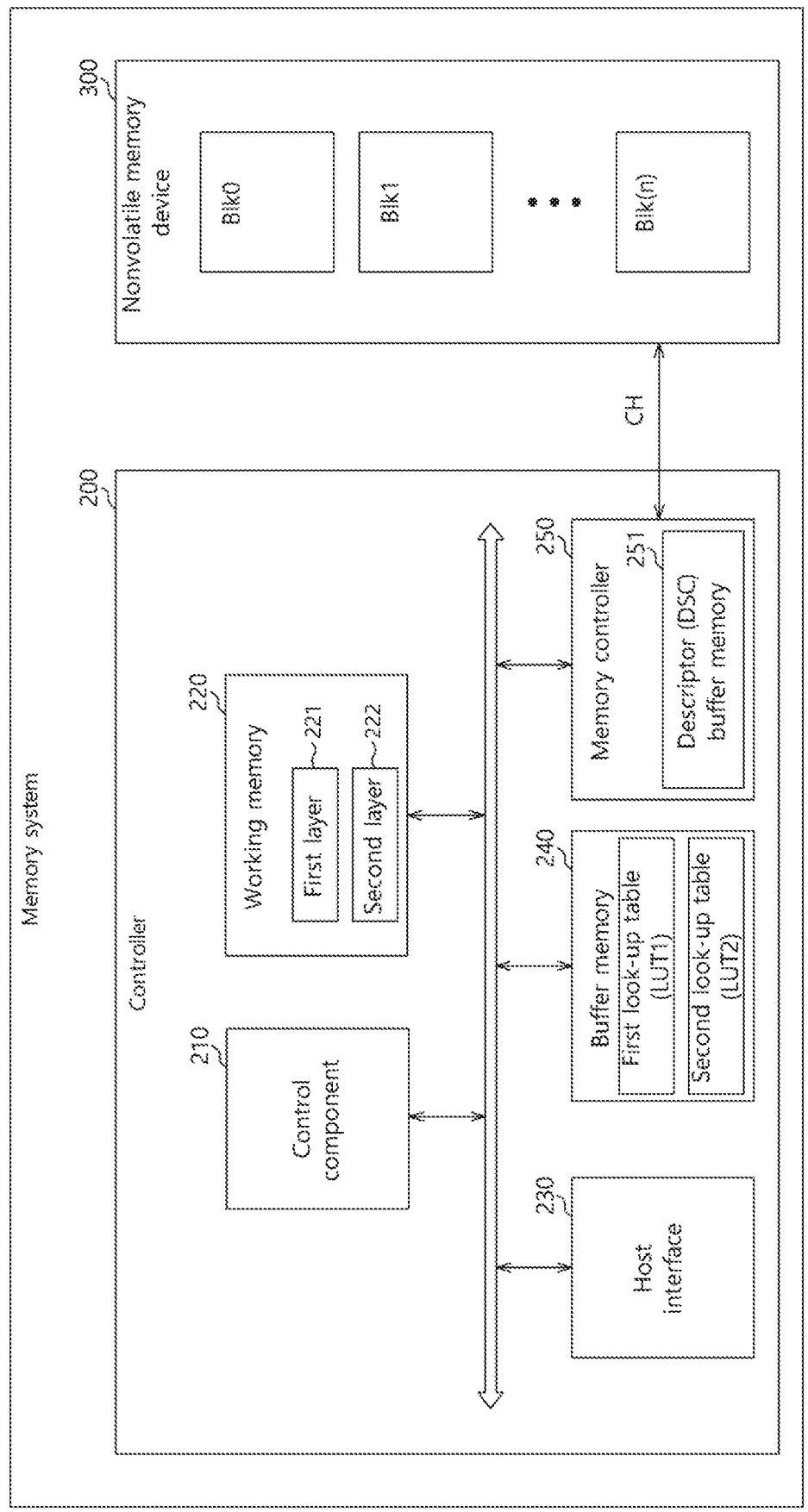
FIG. 1 is a block diagram illustrating a memory system in accordance with an embodiment.

Advantages, features and methods for achieving the present invention will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention. Throughout the disclosure, like reference numerals refer to like parts throughout the various figures and embodiments of the present invention. It is noted that reference to "an embodiment" does not necessarily mean only one embodiment, and different references to "an embodiment" are not necessarily to the same embodiment(s).

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

The terminology used herein is for the purpose of describing particular embodiments only and is not intended to be limiting of the present invention.

As used herein, singular forms may include the plural forms as well and vice versa, unless the context clearly indicates otherwise.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

Hereinafter, a memory system, an operating method thereof and an electronic apparatus will be described below with reference to the accompanying drawings through various examples of embodiments.

FIG. 1 is a block diagram illustrating a memory system 100 in accordance with an embodiment.

Referring to FIG. 1, the memory system 100 may store data to be accessed by a host device (e.g., 400 of FIG. 2) such as a mobile phone, an MP3 player, a laptop computer, a desktop computer, a game player, a television (TV), an in-vehicle infotainment system, and so forth.

The memory system 100 may be manufactured as any one of various kinds of storage devices according to a host interface meaning a transmission protocol with the host device. For example, the memory system 100 may be configured as any one of various kinds of storage devices such as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, a memory stick, and so forth.

The memory system 100 may be manufactured as any one among various kinds of package types. For example, the memory system 100 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The memory system 100 may include a controller 200 and a nonvolatile memory device 300. The controller 200 may control the operation of the nonvolatile memory device 300. The controller 200 may include a control component 210, a working memory 220, a host interface 230, a buffer memory 240 and a memory controller 250.

The working memory 220 may store a first layer 221 and a second layer 222 as firmwares (FWs), respectively, driving the nonvolatile memory device 300. The control component 210 may control the nonvolatile memory device 300 based on the firmwares. The buffer memory 240 may be configured to store a first look-up table LUT1 managed by the first layer 221 and a second look-up table LUT2 managed by the second layer 222. The memory controller 250 may store a descriptor in the descriptor (DSC) buffer memory 251 for the setting information of the nonvolatile memory device 300 and may interface with the nonvolatile memory device 300 based on the control of the control component 210.

According to the embodiment, the second layer 222 may store the position information of the descriptor in the second look-up table LUT2, and the first layer 221 may access the memory controller 250 by referring to the second look-up table LUT2.

The control component 210 may be implemented by a micro control unit (MCU) or a central processing unit (CPU). The control component 210 may process a request which is received from the host device. In order to process the request, the control component 210 may drive an instruction or algorithm of a code type, that is, a firmware (FW), loaded in the working memory 220, and may control internal function blocks and the nonvolatile memory device 300. The control component 210 may generate the descriptor necessary to control the nonvolatile memory device 300, and may control the generated descriptor to be stored in a descriptor buffer memory 251 of the memory controller 250.

The working memory 220 may be implemented by a random access memory (RAM) such as a dynamic random access memory (DRAM) or a static random access memory (SRAM). The working memory 220 may store firmwares (FWs) which are driven by the control component 210. Also, the working memory 220 may store data necessary to drive the firmwares (FWs).

Figure 2:
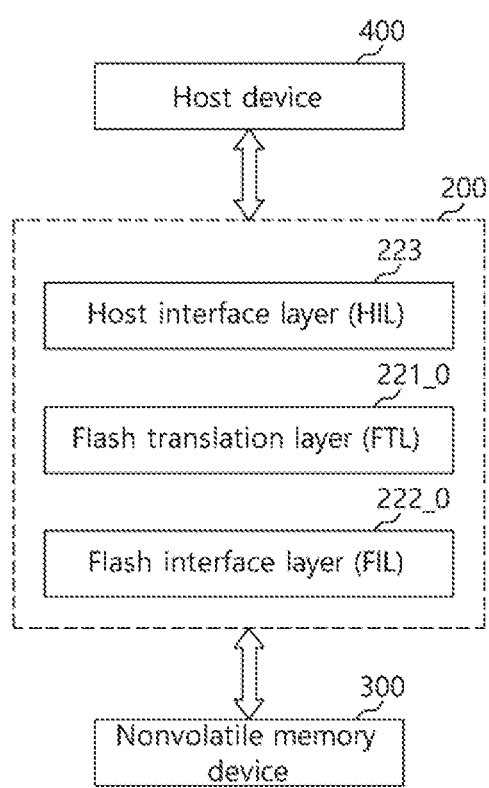
FIG. 2 is a diagram illustrating layers of firmwares of a controller in accordance with the embodiment.

The working memory 220 may include the first layer 221 which includes a flash translation layer (FTL), for example, 221_0 of FIG. 2. Further, the working memory 220 may include the second layer 222 which is coupled with the memory controller 250 and includes a flash interface layer (FIL), for example, 222_0 of FIG. 2. Detailed descriptions for the first layer 221 and the second layer 222 will be made later with reference to FIG. 2.

The host interface 230 may interface between the host device and the memory system 100. For instance, the host interface 230 may communicate with the host device through any one of standard transmission protocols such as secure digital (SD), universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e or PCIe) and universal flash storage (UFS), that is, by using a host interface.

The buffer memory 240 may be implemented by a random access memory (RAM) such as a dynamic random access memory (DRAM) or a static random access memory (SRAM). The buffer memory 240 may temporarily store data corresponding to a request of the host device. That is, the buffer memory 240 may perform data buffering. For instance, the buffer memory 240 may read out read data corresponding to a read request of the host device from the nonvolatile memory device 300, and may temporarily store the read-out read data. For another instance, the buffer memory 240 may temporarily store write data corresponding to a write request of the host device, and may transmit the temporarily stored write data to the nonvolatile memory device 300.

Also, the buffer memory 240 may store metadata necessary to drive the firmwares (FW). The metadata may mean the data generated in the memory system 100 to manage user data or the nonvolatile memory device 300. The metadata may include all remaining information and data except data corresponding to a request received from the host device. For example, the metadata may include a read count table, a bad block table, a valid page count table, an address mapping table, and so forth for the memory blocks of the nonvolatile memory device 300.

The buffer memory 240 may be configured to store the first look-up table LUT1 and the second look-up table LUT2. The first look-up table LUT1 may be managed by the firmware based on the first layer 221, and the second look-up table LUT2 may be managed by the firmware based on the second layer 222. The first look-up table LUT1 and the second look-up table LUT2 will be described in detail with reference to FIGS. 3 and 4.

The memory controller 250 may control the nonvolatile memory device 300 based on the descriptor generated by the control component 210. The memory controller 250 may provide the data stored in the buffer memory 240, to the nonvolatile memory device 300, based on the descriptor. The memory controller 250 may include an input/output driver (not shown) which generates and drives control signals and data. The descriptor may mean a work order in which a work to be processed by the memory controller 250 to control the nonvolatile memory device 300 is described. The descriptor may be generated by the control component 210, and may be decoded and executed by the memory controller 250. For this reason, the descriptor may include a firmware management information that is managed by the control component 210 (or the firmware driven by the control component 210), a memory controller operation information that is necessary for the memory controller 250 to operate, and a nonvolatile memory device control information that the memory controller 250 refers to in order to control the nonvolatile memory device 300. The information included in the descriptor according to the embodiment will be described later with reference to FIGS. 3 and 4.

The memory controller 250 may also include a memory interface (not shown). The memory interface may control the nonvolatile memory device 300 according to the control of the control component 210. The memory interface may provide control signals to the nonvolatile memory device 300. The control signals may include a command, an address, a control signal and so forth for controlling the nonvolatile memory device 300. The memory interface may provide data to the nonvolatile memory device 300 or may be provided with data from the nonvolatile memory device 300.

The memory controller 250 may include the descriptor buffer memory 251. The descriptor buffer memory 251 may be implemented by a random access memory (RAM) such as a dynamic random access memory (DRAM) or a static random access memory (SRAM). The descriptor buffer memory 251 may store the descriptor generated by the control component 210. The control component 210 may control the nonvolatile memory device 300 on the basis of the firmware based on the first layer 221, and may generate a descriptor to control the nonvolatile memory device 300, by referring to the setting information of the nonvolatile memory device 300 stored in the descriptor.

The nonvolatile memory device 300 may be implemented by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide.

Figure 10:
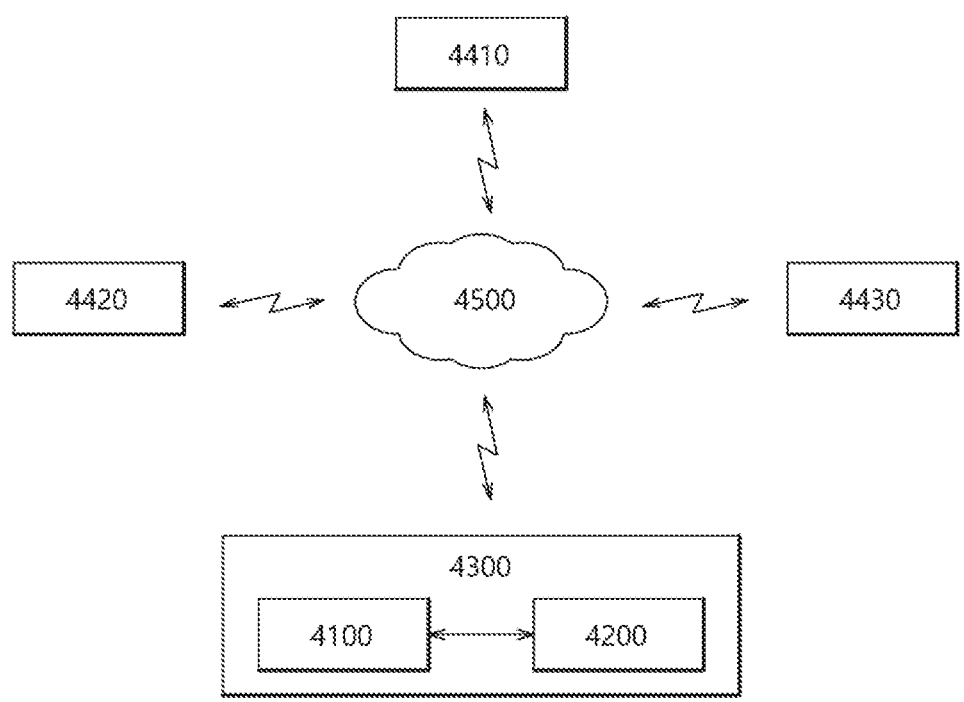
FIG. 10 is a diagram illustrating a network system including a memory system in accordance with an embodiment.

The nonvolatile memory device 300 may include a memory cell array (e.g., 310 of FIG. 10). From an operational viewpoint or a physical (or structural) viewpoint, the memory cells included in the memory cell array may be configured as a hierarchical memory cell set or memory cell unit. For example, memory cells which are coupled to the same word line and are to be read and written (or programmed) simultaneously may be configured as a page. In the following descriptions, for convenience, memory cells configured as a page will be referred to as a "page." Also, memory cells to be erased simultaneously may be configured as a memory block. The memory cell array may include a plurality of memory blocks Blk0 to Blk(n), and each of the memory blocks Blk0 to Blk(n) may include a plurality of pages.

FIG. 2 is a diagram illustrating layers of firmwares of a controller 200 in accordance with the embodiment.

Referring to FIGS. 1 and 2, the working memory 220 of the controller 200 may include the first layer 221 and the second layer 222 as firmwares, respectively, driving the nonvolatile memory device 300. The working memory 220 may include the second layer 222 which is coupled with the memory controller 250 and stores the second look-up table LUT2. Also, the working memory 220 may include a host interface layer 223 for receiving a request from the host device 400 and transmitting data corresponding to the request to the host device 400.

According to the embodiment, the first layer 221 may include the flash translation layer 221_0 which stores the mapping information between a logical address corresponding to a request of the host device 400 and a physical address corresponding to the nonvolatile memory device 300.

According to the embodiment, the second layer 222 may include the flash interface layer 222_0 for the communication between the second layer 222 and the memory controller 250. The flash interface layer 222_0 is a standard for the communication between the memory controller 250 (or another component such as the control component 210) and the nonvolatile memory device 300. However, the flash interface layer 222_0, in accordance with the present embodiment, is not limited to a specific component. For example, the flash interface layer 222_0 according to the present disclosure may include a device, a software or the like, which transmits a command to the nonvolatile memory device 300. The flash interface layer 222_0 may manage the physical information of the memory controller 250 and the nonvolatile memory device 300.

The control component 210 may change a logical address corresponding to a request received from the host device 400, to a physical address, based on the flash translation layer 221_0. The control component 210 may transmit a command corresponding to the request to the nonvolatile memory device 300, based on the flash interface layer 222_0. The first layer 221 may be an upper layer of the second layer 222. According to the embodiment, the flash translation layer 221_0 may be an upper layer of the flash interface layer 222_0.

Figure 3:
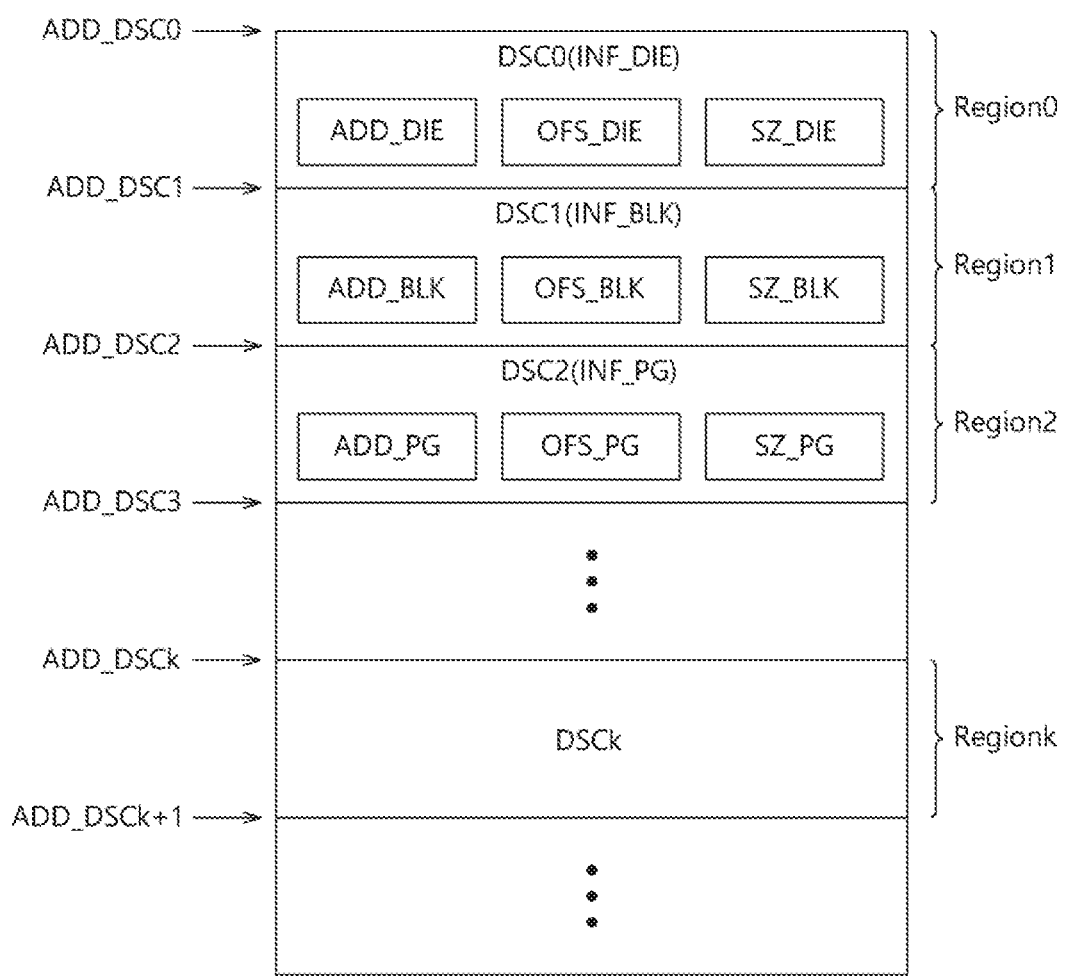
FIG. 3 is a diagram illustrating a descriptor in accordance with the embodiment.

FIG. 3 is a diagram illustrating a descriptor in accordance with the embodiment. It is assumed that a descriptor DSC0 is stored in a region 0, a descriptor DSC1 is stored in a region 1, a descriptor DSC2 is stored in a region 2m and a descriptor DSCk is stored in a region k.

According to the embodiment, the control component 210 of FIG. 1 may generate a descriptor DSC in which a work to be processed by the memory controller 250 to control the nonvolatile memory device 300 is described. The control component 210 may store the generated descriptor DSC in the descriptor buffer memory 251 of the memory controller 250.

Each descriptor DSC may correspond to the address of a descriptor region of the descriptor buffer memory 251 (hereinafter, referred to as a "descriptor address") where the corresponding descriptor DSC is stored. For example, the descriptor DSC0 may correspond to a descriptor address ADD_DSC0, the descriptor DSC1 may correspond to a descriptor address ADD_DSC1, the descriptor DSC2 may correspond to a descriptor address ADD_DSC2, and the descriptor DSCk may correspond to a descriptor address ADD_DSCk.

Each of the regions may be designated as a descriptor address range. For example, the zeroth region Region0 may be a region from the descriptor address ADD_DSC0 to the descriptor address (ADD_DSC1)−1, the 1st region Region1 may be a region from the descriptor address ADD_DSC1 to the descriptor address (ADD_DSC2)−1, the 2nd region Region2 may be a region from the descriptor address ADD_DSC2 to the descriptor address (ADD_DSC3)−1, and the kth region Regionk may be a region from the descriptor address ADD_DSCk to a descriptor address (ADD_DSCk+1)−1.

While each descriptor DSC is generated by the control component 210, it may be referred to and decoded by the memory controller 250. For this reason, the descriptor DSC may be implemented by or may include descriptions such as a field describing information to be managed by the control component 210 (or a firmware or a software driven by the control component 210), a field describing information necessary for the operation of the memory controller 250, and a field describing information necessary for the memory controller 250 to control the nonvolatile memory device 300.

While not shown, the information to be managed by the control component 210 may include a descriptor offset (or a descriptor identifier (ID)) given when the descriptor DSC is generated, and a state information which is reported to the control component 210 or is referred to by the control component 210, as a processing result of the descriptor DSC. The information to be managed by the control component 210 may include a descriptor address DSC_ADD.

According to the embodiment, the descriptor DSC may store the setting information of the nonvolatile memory device 300. For example, the setting information may include the address information or offset information of at least one among the dies, planes, blocks, word lines and pages of the nonvolatile memory device 300.

For example, as shown, the descriptor DSC0 may include information INF_DIE on at least one die included in the nonvolatile memory device 300. The descriptor DSC© may include address information ADD_DIE, offset information OFS_DIE, and size information SZ_DIE of data able to be stored (or data to be stored), of each die. The descriptor DSC1 may include information INF_BLK on at least one block included in the nonvolatile memory device 300. The descriptor DSC1 may include address information ADD_BLK, offset information OFS_BLK, and size information SZ_BLK of data able to be stored (or data to be stored), of each block. The descriptor DSC2 may include information INF_PG on at least one page included in the nonvolatile memory device 300. The descriptor DSC2 may include address information ADD_PG, offset information OFS_PG, and size information SZ_PG of data able to be stored (or data to be stored), of each page.

While not shown, the descriptor DSC may include a delay time, meaning a time required for an internal operation of the nonvolatile memory device 300 (for example, a program operation or a sensing operation for memory cells), and may further include a special command necessary to control the nonvolatile memory device 300, a timing information on a signal, and so forth.

FIG. 4 is a diagram illustrating a second look-up table LUT2 in accordance with the embodiment. It is assumed that information on the descriptors illustrated in FIG. 3 are stored in the second look-up table LUT2.

Referring to FIGS. 1, 3, and 4, the control component 210 may store the position information of the descriptor DSC in the second look-up table LUT2 based on the second layer 222. The position information may include information on a position where the setting information of each descriptor DSC is stored in the descriptor DSC.

As described above, among setting information, the die information INF_DIE may include the address information ADD_DIE of a die, the offset information OFS_DIE of the die, and the size information SZ_DIE of data able to be stored (or data to be stored) in the die, and is stored in the region Region0 of the descriptor. The second look-up table LUT2 may store the descriptor in which the die information INF_DIE is stored and information on a descriptor address, that is, position information. For example, the second look-up table LUT2 may include information that the die information INF_DIE is stored in the descriptor DSC0, and the descriptor DSC0 in which the die information INF_DIE is stored is positioned at the descriptor address ADD_DSC0. Depending on an embodiment, the second look-up table LUT2 may include information that the die information INF_DIE is stored in the descriptor DSC0, and the descriptor DSC0 in which the die information INF_DIE is stored is positioned at a region where the descriptor DSC0 is stored (for example, the region Region0) instead of the address ADD_DSC0.

As described above with reference to FIG. 3, the block information INF_BLK may include the address information ADD_BLK of a block, the offset information OFS_BLK of the block and the size information SZ_BLK of data able to be stored (or data to be stored) in the block, and is stored in the region Region1 of the descriptor. According to the embodiment, the address information ADD_BLK of the block may include information on the range of a physical address corresponding to the corresponding block. Also, the block information INF_BLK may include information indicating an offset value of a die or an offset value of a plane that the corresponding block belongs to or is included in. The second look-up table LUT2 may store the descriptor in which the block information INF_BLK is stored and information on a descriptor address, that is, position information. For example, the second look-up table LUT2 may include information that the block information INF_BLK is stored in the descriptor DSC1, and the descriptor DSC1 in which the block information INF_BLK is stored is positioned at the descriptor address ADD_DSC1. According to the embodiment, not the descriptor address ADD_DSC1 but a region (for example, the region Region1) where the descriptor DSC1 is included may be stored. Depending on an embodiment, the second look-up table LUT2 may include information that the block information INF_BLK is stored in the descriptor DSC1, and the descriptor DSC1 in which the die information INF_BLK is stored is positioned at a region where the descriptor DSC1 is stored (for example, the region Region1) instead of the address ADD_DSC1.

As described above, the page information INF_PG may include the address information ADD_PG of a page, the offset information OFS_PG of the page, and the size information SZ_PG of data able to be stored (or data to be stored) in the page, and is stored in the region Region2 of the descriptor. According to the embodiment, the address information ADD_PG of the page may include information on the range of a physical address corresponding to the corresponding page. Also, the page information INF_PG may include information indicating an offset value of a die, an offset value of a plane, or an offset value of a block that the corresponding page belongs to or is included in. According to the embodiment, the offset information OFS_PG of the page may include information on that the corresponding page is a page positioned in which word line of a block in which the corresponding page is included. The second look-up table LUT2 may store the descriptor in which the page information INF_PG is stored and information on a descriptor address, that is, a position information. For example, the second look-up table LUT2 may include information that the page information INF_PG is stored in the descriptor DSC2, and the descriptor DSC2 in which the page information INF_PG is stored is positioned at the descriptor address ADD_DSC2. Depending on an embodiment, the second look-up table LUT2 may include information that the block information INF_BLK is stored in the descriptor DSC1, and the descriptor DSC1 in which the die information INF_BLK is stored is positioned at a region where the descriptor DSC1 is stored (for example, the region Region1) instead of the address ADD_DSC1.

The firmware structure of the controller 200 of a memory system such as an SSD and a UFS may include the flash translation layer 221_0 which manages the logical information of the host device 400 and the flash interface layer 222_0 which manages the physical information of the nonvolatile memory device 300, and the flash translation layer 221_0 belongs to the upper layer of the flash interface layer 222_0. The memory controller 250 may store the descriptor which includes the setting information of the nonvolatile memory device 300. The controller 200 refers to the descriptor and performs communication with the nonvolatile memory device 300 through the memory controller 250. The position information of the descriptor, that is, information on a position where each of a plurality of setting information is stored in a descriptor, is generated in both a data structure which is managed and is referred to by the flash translation layer 221_0 and a data structure which is managed and is referred to by the flash interface layer 222_0. When the position information of the descriptor is changed due to the update or the like of the memory controller 250, the position information of the descriptor existing in the plurality of data structures should be changed, and due to this fact, inefficiency is caused. Also, due to this fact, dependency between different layers exists. In this case, in order for the update of the descriptor which is referred to by the flash translation layer 221_0 to generate a command and so forth, since the data structures which are managed by the flash translation layer 221_0 and the flash interface layer 222_0 should be updated in duplicate, layering and independency between different layers may be not ensured.

In the memory system 100 in accordance with the embodiment, the position information of the descriptor DSC may not be generated and stored in duplicate in look-up tables LUT which are managed by the first layer 221 and the second layer 222, respectively. In this case, one firmware layer (e.g., the second layer 222) may generate the position information on the descriptor DSC whereas the other firmware layer (e.g., the first layer 221) may refer to the generated position information. In other words, the one firmware layer (e.g., the second layer 222) which is coupled with the memory controller 250 to communicate with the nonvolatile memory device 300 may manage the descriptor DSC which includes the setting information of the nonvolatile memory device 300, whereas the other firmware layer (e.g., the first layer 221) which generates a command of an operation to be performed in the nonvolatile memory device 300 may refer to the look-up table LUT which is managed by the one firmware layer (e.g., the second layer 222). As a result, since the position information of the descriptor DSC is not generated in duplicate, it is possible to efficiently operate the memory system 100. Further, when a region in which the setting information of the nonvolatile memory device 300 is positioned in the descriptor DSC is changed due to a change or update of the memory controller 250 (for example, a change of a word line in which the setting information is stored), it is not necessary to change tables which are managed by the plurality of firmwares, and it is sufficient to change only a table which is managed by the second layer 222. Therefore, layering and independency between different layers may be ensured.

While not shown, in accordance with an embodiment of the present disclosure, an electronic apparatus in which a controller executes instructions necessary to implement an operation of a non-transitory machine-readable storage medium may be implemented. The electronic apparatus may include a controller which includes a first layer and a second layer as firmwares each driving a system, and a non-transitory machine-readable storage medium in which instructions to be executed by the controller are stored by being encoded. The non-transitory machine-readable storage medium may be implemented by a nonvolatile memory device.

According to an embodiment, instructions may include instructions which generate a descriptor for the setting information of the non-transitory machine-readable storage medium, store the position information of the descriptor in a look-up table managed by a second layer, obtain the position information by accessing the look-up table based on a first layer, obtain the setting information by accessing the descriptor based on the obtained position information, and generate a command to access the non-transitory machine-readable storage medium by referring to the obtained setting information.

According to an embodiment, instructions may include instructions which determine whether the descriptor for the setting information of the non-transitory machine-readable storage medium has been updated or not, and control the look-up table to be updated based on the second layer, when it is determined that the descriptor has been updated.

As described above, the first layer may include a flash translation layer (FTL) which stores the mapping information between a logical address corresponding to a request of a host device and a physical address corresponding to the non-transitory machine-readable storage medium, and the second layer may include a flash interface layer (FIL) for the communication between the second layer and the non-transitory machine-readable storage medium.

Figure 5:
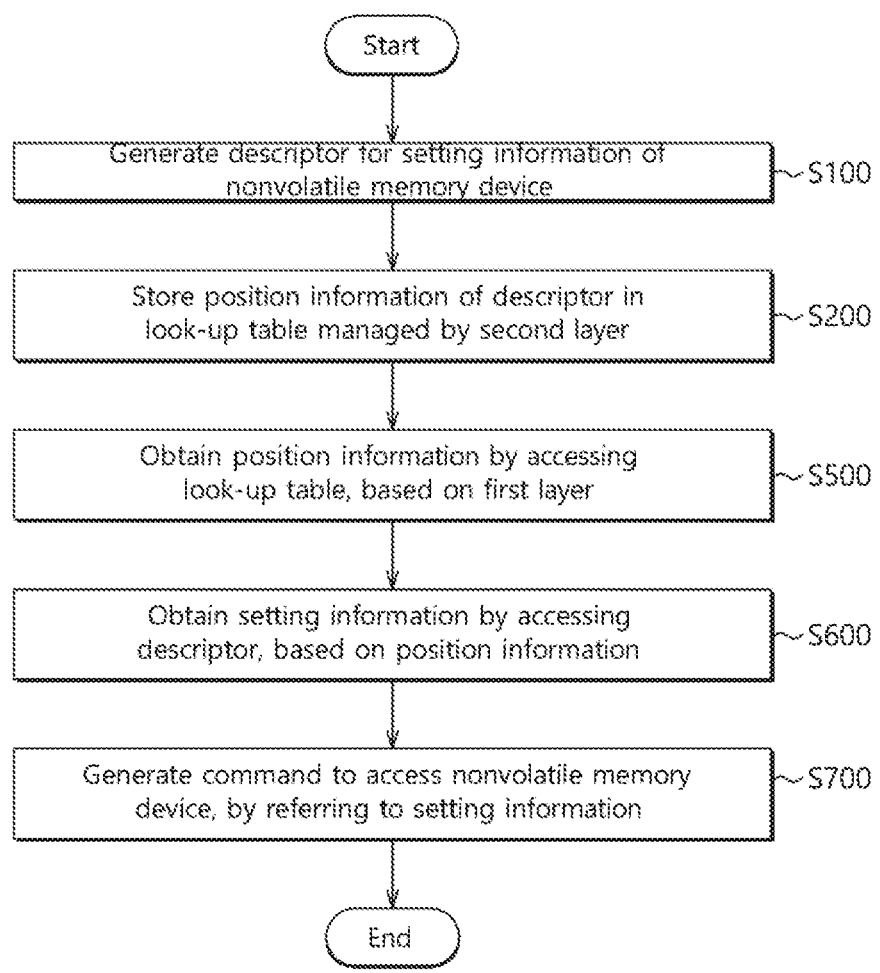
FIGS. 5 and 6 are flow charts illustrating operations of a memory system in accordance with embodiments.

FIG. 5 is a flow chart describing an operation of a memory system in accordance with an embodiment. Hereunder, an operation of the memory system 100 in accordance with an embodiment will be described with references to FIGS. 1 to 5.

The operation of the memory system 100 in accordance with the embodiment may include generating a descriptor DSC for the setting information of the nonvolatile memory device 300 by the controller 200 at step S100, and storing the position information of the descriptor DSC in a look-up table managed by the second layer 222 at step S200. Also, the operation may include may include obtaining the position information by accessing the look-up table based on the first layer 221 at step S500. Further, the operation may include obtaining the setting information by accessing the descriptor DSC based on the obtained position information at step S600. Additionally, the operation may include generating a command to access the nonvolatile memory device 300, by referring to the obtained setting information at step S700.

According to the embodiment, the first layer 221 may include the flash translation layer (FTL) 221_0 which stores the mapping information between a logical address corresponding to a request of the host device 400 and a physical address corresponding to the nonvolatile memory device 300. The second layer 222 may include the flash interface layer (FIL) 222_0 for the communication between the second layer 222 and the nonvolatile memory device 300.

According to the embodiment, the setting information included in the descriptor DSC may include the address information or offset information of at least one among the dies, planes, blocks and pages of the nonvolatile memory device 300. According to the embodiment, the position information of the descriptor DSC may include information on a position where the setting information is stored in the descriptor DSC.

Figure 6:
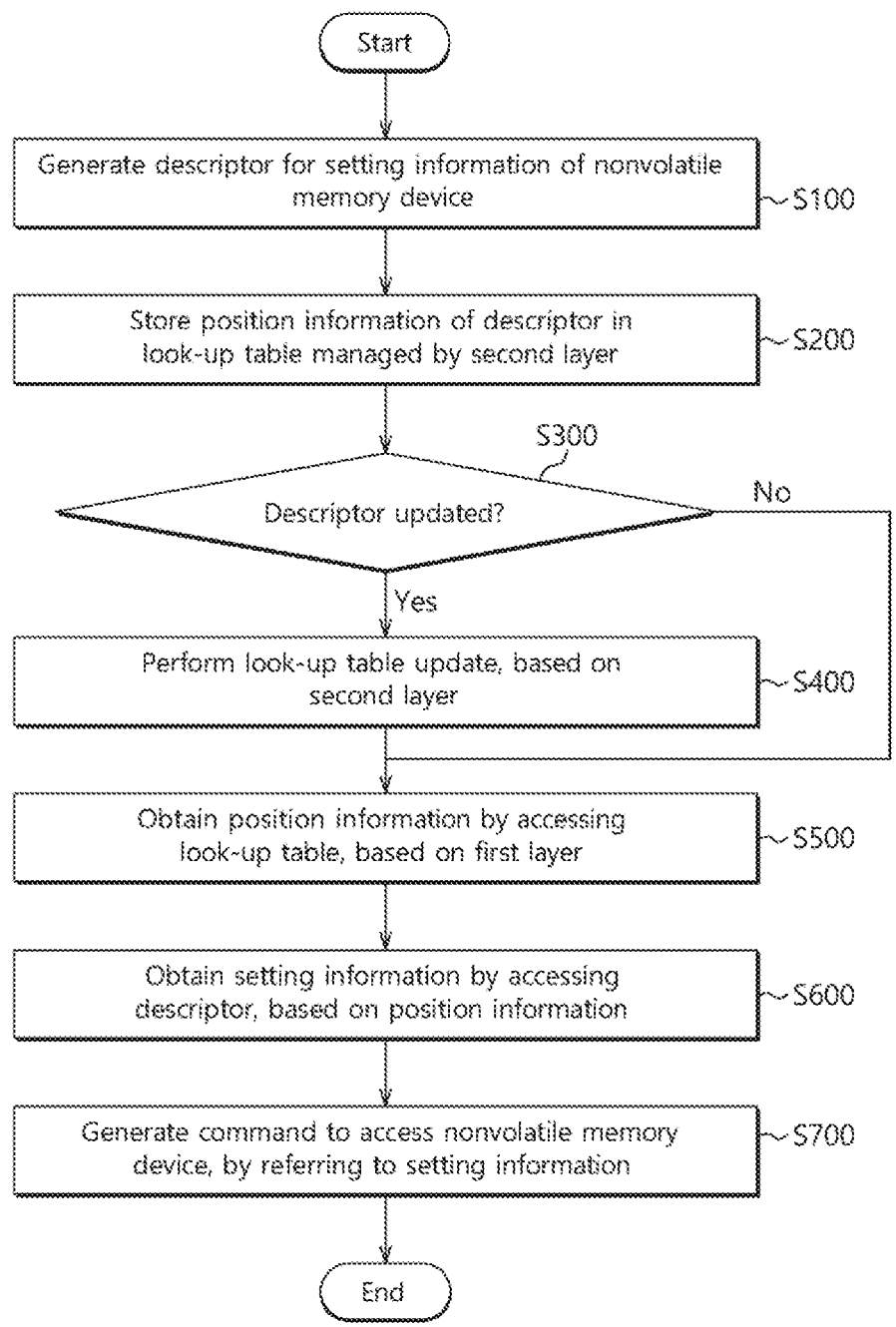

FIG. 6 is a flow chart describing an operation of a memory system in accordance with an embodiment. Hereunder, an operation of the memory system 100 in accordance with an embodiment will be described with references to FIGS. 1 to 4 and FIG. 6.

The operation of the memory system 100 in accordance with the embodiment may include generating a descriptor DSC for the setting information of the nonvolatile memory device 300 by the controller 200 at S100, and storing the position information of the descriptor DSC in a look-up table managed by the second layer 222 at step S200. Also, the operation may include determining whether the descriptor DSC has been updated or not, by the controller 200 at step S300, and updating the look-up table based on the second layer 222 when it is determined that the descriptor DSC has been updated at step S400 (that is, "Yes" at step S300). Further, the operation may include obtaining the position information by accessing the look-up table based on the first layer 221 at step S500. The step S500 may be performed when the descriptor DSC has not been updated. Then, the setting information may be obtained by accessing the descriptor DSC based on the obtained position information at step S600. Additionally, the operation may include generating a command to access the nonvolatile memory device 300, by referring to the setting information at step S700.

Figure 7:
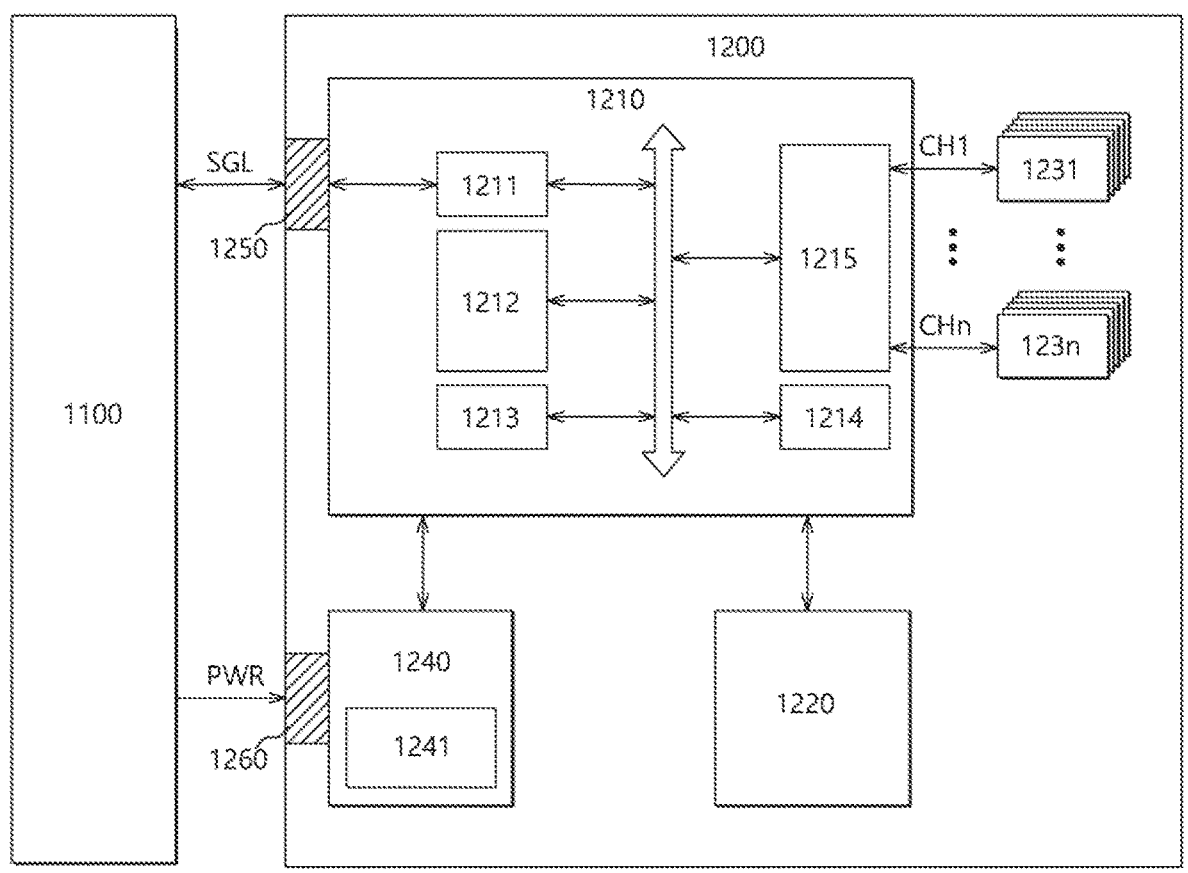
FIG. 7 is a diagram illustrating a data processing system including a solid state drive (SSD) in accordance with an embodiment.

FIG. 7 is a diagram illustrating a data processing system 1000 in accordance with an embodiment. Referring to FIG. 7, the data processing system 1000 may include a host device 1100 and a solid state drive (SSD) 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200. The controller 1210 may include a host interface 1211, a control component 1212, a random access memory 1213, an error correction code (ECC) component 1214, and a memory interface 1215.

The host interface 1211 may exchange a signal SGL with the host device 1100 through the signal connector 1250. The signal SGL may include a command, an address, data, and so forth. The host interface 1211 may interface the host device 1100 and the SSD 1200 according to the protocol of the host device 1100. For example, the host interface 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (DATA), serial advanced technology attachment (SATA), small computer system interface (SCSI), serial attached SCSI (SAS), peripheral component interconnection (PCI), PCI express (PCI-e or PCIe) and universal flash storage (UFS).

The control component 1212 may analyze and process a signal SGL inputted from the host device 1100. The control component 1212 may control operations of internal function blocks according to a firmware or a software for driving the SSD 1200. The random access memory 1213 may be used as a working memory for driving such a firmware or software.

The ECC component 1214 may generate the parity data of data to be transmitted to the nonvolatile memory devices 1231 to 123$n$. The generated parity data may be stored together with the data in the nonvolatile memory devices 1231 to 123$n$, The ECC component 1214 may detect an error of the data read out from the nonvolatile memory devices 1231 to 123$n$, based on the parity data. If a detected error is within a correctable range, the ECC component 1214 may correct the detected error.

The memory interface 1215 may provide control signals such as commands and addresses to the nonvolatile memory devices 1231 to 123$n$, according to control of the control component 1212. Moreover, the memory interface 1215 may exchange data with the nonvolatile memory devices 1231 to 123$n$, according to control of the control component 1212. For example, the memory interface 1215 may provide the data stored in the buffer memory device 1220, to the nonvolatile memory devices 1231 to 123$n$, or provide the data read out from the nonvolatile memory devices 1231 to 123$n$, to the buffer memory device 1220.

The buffer memory device 1220 may temporarily store data to be stored in the nonvolatile memory devices 1231 to 123$n$. Further, the buffer memory device 1220 may temporarily store the data read out from the nonvolatile memory devices 1231 to 123$n$. The data temporarily stored in the buffer memory device 1220 may be transmitted to the host device 1100 or the nonvolatile memory devices 1231 to 123$n$ according to control of the controller 1210.

The nonvolatile memory devices 1231 to 123$n$ may be used as storage media of the SSD 1200. The nonvolatile memory devices 1231 to 123$n$ may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include at least one capacitor having large capacity.

The signal connector 1250 may be implemented by various types of connectors depending on an interface scheme between the host device 1100 and the SSD 1200.

The power connector 1260 may be implemented by various types of connectors depending on a power supply scheme of the host device 1100.

Figure 8:
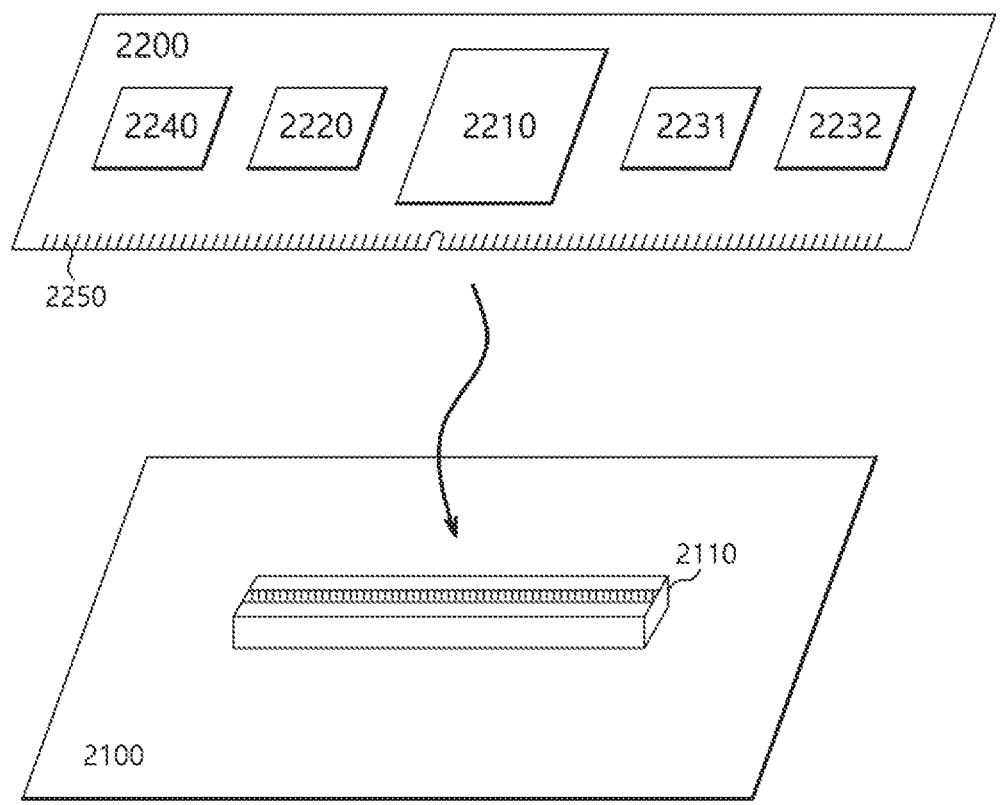
FIG. 8 is a diagram illustrating a data processing system including a memory system in accordance with an embodiment.

FIG. 8 is a diagram illustrating a data processing system 2000 in accordance with an embodiment. Referring to FIG. 8, the data processing system 2000 may include a host device 2100 and a data storage device 2200.

The host device 2100 may be implemented in the form of a board such as a printed circuit board. Although not shown, the host device 2100 may include internal function blocks for performing functions.

The host device 2100 may include a connection terminal 2110 such as a socket, a slot or a connector. The data storage device 2200 may be mounted to the connection terminal 2110.

The data storage device 2200 may be implemented in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be implemented in the same manner as the controller 1210 shown in FIG. 7.

The buffer memory device 2220 may temporarily store data to be stored in the nonvolatile memory devices 2231 and 2232. Further, the buffer memory device 2220 may temporarily store the data read out from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 9:
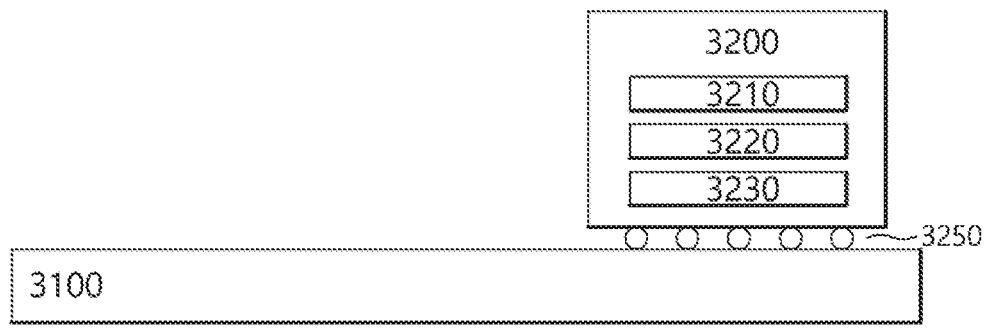
FIG. 9 is a diagram illustrating a data processing system including a memory system in accordance with an embodiment.

FIG. 9 is a diagram illustrating a data processing system 3000 in accordance with an embodiment. Referring to FIG. 9, the data processing system 3000 may include a host device 3100 and a data storage device 3200.

The host device 3100 may be implemented in the form of a board such as a printed circuit board. Although not shown, the host device 3100 may include internal function blocks for performing functions.

The data storage device 3200 may be implemented in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 7.

The buffer memory device 3220 may temporarily store data to be stored in the nonvolatile memory device 3230. Further, the buffer memory device 3220 may temporarily store the data read out from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as a storage medium of the data storage device 3200.

FIG. 10 is a diagram illustrating a network system 4000 in accordance with an embodiment. Referring to FIG. 10, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and a data storage device 4200. The data storage device 4200 may be implemented by the data storage device 100 shown in FIG. 1, the SSD 1200 shown in FIG. 7, the data storage device 2200 shown in FIG. 8 or the data storage device 3200 shown in FIG. 9.

Figure 11:
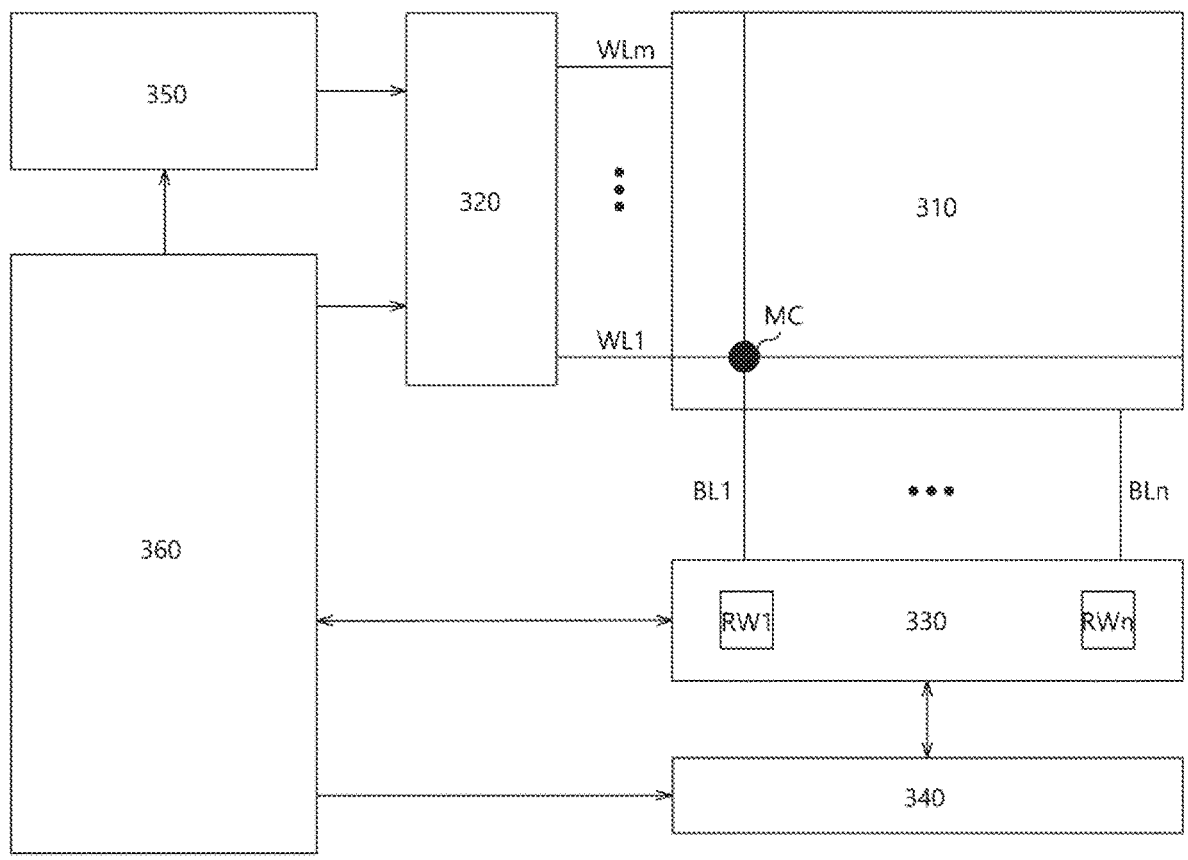
FIG. 11 is a diagram illustrating a nonvolatile memory device included in a memory system in accordance with an embodiment.

FIG. 11 is a diagram illustrating a nonvolatile memory device 300 included in a data storage device in accordance with an embodiment. Referring to FIG. 11, the nonvolatile memory device 300 may include a memory cell array 310, a row decoder 320, a data read and write (read/write) block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to the control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to the control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For still another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control the read, write and erase operations of the nonvolatile memory device 300.

While various embodiments have been described above, it will be understood to those skilled in the art that the embodiments described are examples only. Accordingly, the memory system, the operating method thereof and the electronic apparatus described herein should not be limited based on the described embodiments.

What is claimed is:

1. A memory system comprising:
   a nonvolatile memory device;
   a working memory configured to store a first firmware layer and a second firmware layer, each of which drives the nonvolatile memory device;
   a control component configured to control the nonvolatile memory device and generate a descriptor, and to store the descriptor in a descriptor buffer memory,
   wherein the descriptor includes setting information for an address of data to be stored in the nonvolatile memory device, and a descriptor address indicating the location of the descriptor in the descriptor address buffer;
   a buffer memory configured to store a first table which includes the descriptor and is managed by the first firmware layer, and a second table which includes a table address for the descriptor in the first table and is managed by the second firmware layer; and
   a memory controller including the descriptor buffer memory, which is configured to store the descriptor, and interface with the nonvolatile memory device based on control of the control component,
   wherein the second firmware layer stores the table address of the descriptor in the second table, and
   wherein the first firmware layer accesses the descriptor in the descriptor memory buffer of the memory controller by referring to the table address of the descriptor in the second table in order to look up the descriptor address for the descriptor memory buffer.

2. The memory system according to claim 1, wherein, when the descriptor is updated, the second firmware layer updates the second table by referring to the table address of the updated descriptor.

3. The memory system according to claim 1,
   wherein the first firmware layer includes a flash translation layer (FTL) which stores mapping information between a logical address corresponding to a request of a host device and a physical address corresponding to the nonvolatile memory device, and
   wherein the second firmware layer includes a flash interface layer (FIL) for communication between the second firmware layer and the memory controller.

4. The memory system according to claim 1, wherein the setting information includes address information or offset information of at least one among dies, planes, blocks, word lines, and pages of the nonvolatile memory device.

5. The memory system according to claim 4, wherein the table address includes information for a region where the descriptor is stored in the first table.

6. The memory system according to claim 1, wherein the descriptor includes a delay time that is a time required for program or sensing operations of the nonvolatile memory device.

7. The memory system according to claim 1, wherein the working memory includes a host interface layer for receiving a request from a host device and transmitting data corresponding to the request to the host device.

8. A method for operating a memory system, comprising:
generating, by a controller, a descriptor for a nonvolatile memory device,
wherein the descriptor includes a setting information for an address of data to be stored in the nonvolatile memory device, and a descriptor address indicating the location of the descriptor in a descriptor address buffer;
storing a table address of the descriptor in a second table which is managed by a second layer;
obtaining the table address by accessing a first table which is managed by a first layer;
obtaining the setting information by accessing the descriptor based on the table address; and
generating a command to access the nonvolatile memory device, by referring to the setting information.

9. The method according to claim 8, further comprising:
determining whether the descriptor is updated or not; and
updating the second table by the second layer when it is determined that the descriptor is updated.

10. The method according to claim 8,
wherein the first layer includes a flash translation layer (FTL) which stores mapping information between a logical address corresponding to a request of a host device and a physical address corresponding to the nonvolatile memory device, and
wherein the second layer includes a flash interface layer (FIL) for communication between the second layer and the nonvolatile memory device.

11. The method according to claim 8, wherein the setting information includes address information or offset information of at least one among dies, planes, blocks, word lines, and pages of the nonvolatile memory device.

12. The method according to claim 11, wherein the table address includes a region where the descriptor is stored in the first table.

13. An electronic apparatus comprising:
a controller including a first firmware layer and a second firmware layer, each of which drives a memory system; and
a non-transitory machine-readable storage medium for storing instructions to be executed by the controller that instruct the controller to perform processes comprising:
generating a descriptor for the non-transitory machine-readable storage medium,
wherein the descriptor includes setting information for an address of data to be stored in the non-transitory machine-readable storage medium, and a descriptor address indicating the location of the descriptor in a descriptor address buffer;
storing a table address of the descriptor in a second table which is managed by the second firmware layer;
obtaining the table address by accessing a first table by the first firmware layer;
retrieving the descriptor from the descriptor address buffer by accessing the descriptor based on using the table address obtained to lookup the descriptor address in the first table to obtain the location of the descriptor in the descriptor address buffer; and
generating a command to access the non-transitory machine-readable storage medium by referring to the setting information.

14. The electronic apparatus according to claim 13, wherein the instructions instruct the controller to perform processes further comprising: determining whether the descriptor is updated or not, and controlling the second table to be updated based on the second firmware layer, when it is determined that the descriptor is updated.

15. The electronic apparatus according to claim 13,
wherein the first firmware layer includes a flash translation layer (FTL) which stores mapping information between a logical address corresponding to a request of a host device and a physical address corresponding to the non-transitory machine-readable storage medium, and
wherein the second firmware layer includes a flash interface layer (FIL) for communication between the second firmware layer and the non-transitory machine-readable storage medium.

16. The electronic apparatus according to claim 13, wherein the setting information includes address information or offset information of at least one among dies, planes, blocks and pages of the non-transitory machine-readable storage medium.

17. The electronic apparatus according to claim 16, wherein the table address includes a region where the descriptor is stored in the first table.

18. A controller for a nonvolatile memory device comprising:
a flash translation firmware layer and a flash interface firmware layer for driving the nonvolatile memory device;
firmware flash interface firmware layer
a control component configured to control the nonvolatile memory device and generate a descriptor, and to store the descriptor in a descriptor buffer memory,
wherein the descriptor includes setting information for an address of data to be stored in the nonvolatile memory device, and a descriptor address indicating the location of the descriptor in the descriptor address buffer;
a buffer memory including a first table for storing the descriptor which is managed by the flash translation firmware layer and a second table for storing a table address of the descriptor which is managed by the flash interface firmware layer;
a memory controller including the descriptor buffer memory, which is configured to store the descriptor, and interface with the nonvolatile memory device; and
wherein the control component controls the flash interface firmware layer to store a table address of the descriptor in the second table, and the flash translation firmware layer accesses the nonvolatile memory device through the memory controller based on looking up the table address of the descriptor to access the second table in order to retrieve the descriptor address for the descriptor buffer memory.

* * * * *